(12) United States Patent
Cuddihy et al.

(10) Patent No.: US 9,399,410 B2
(45) Date of Patent: Jul. 26, 2016

(54) HIDDEN FRONT PASSENGER SEAT HEAD RESTRAINT FOR IMPROVED VISABILITY

(71) Applicant: Ford Global Technologies, LLC, Dearborn, MI (US)

(72) Inventors: Mark A. Cuddihy, New Boston, MI (US); Manoharprasad K. Rao, Novi, MI (US); Mangala A. Jayasuriya, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 289 days.

(21) Appl. No.: 13/897,897

(22) Filed: May 20, 2013

(65) Prior Publication Data

US 2014/0339868 A1 Nov. 20, 2014

(51) Int. Cl.
*B60N 2/02* (2006.01)
*B60N 2/00* (2006.01)
*B60N 2/48* (2006.01)

(52) U.S. Cl.
CPC .............. *B60N 2/0224* (2013.01); *B60N 2/002* (2013.01); *B60N 2/482* (2013.01); *B60N 2/487* (2013.01); *B60N 2/4829* (2013.01); *B60N 2/4832* (2013.01)

(58) Field of Classification Search
CPC ...... B60N 2/482; B60N 2/4829; B60N 2/487; B60N 2/002; B60N 2/0224; B60N 2/4832
USPC ................................................ 701/36, 45, 49
See application file for complete search history.

(56) References Cited

U.S. PATENT DOCUMENTS

2012/0235459 A1* 9/2012 Yetukuri et al. ............... 297/391
2014/0292057 A1* 10/2014 Runde et al. ................... 297/410

* cited by examiner

*Primary Examiner* — Kim T Nguyen
(74) *Attorney, Agent, or Firm* — LeClairRyan

(57) ABSTRACT

An interior arrangement for a vehicle including a front passenger seat having a head restraint, a rear seat, seat occupant sensors fitted to the seats, a head restraint position sensor, a motor for moving the head restraint between its functional position and its lowered position, and a central controller operatively associated with the sensors and the motor. The front passenger head restraint is moved up to its functional position from a stowed position each time a front seat passenger presence is detected according to one embodiment. According to another embodiment the front passenger head restraint is moved from a functional or upright position to a stowed or hidden position if the front seat is unoccupied and the rear seat is occupied.

8 Claims, 6 Drawing Sheets

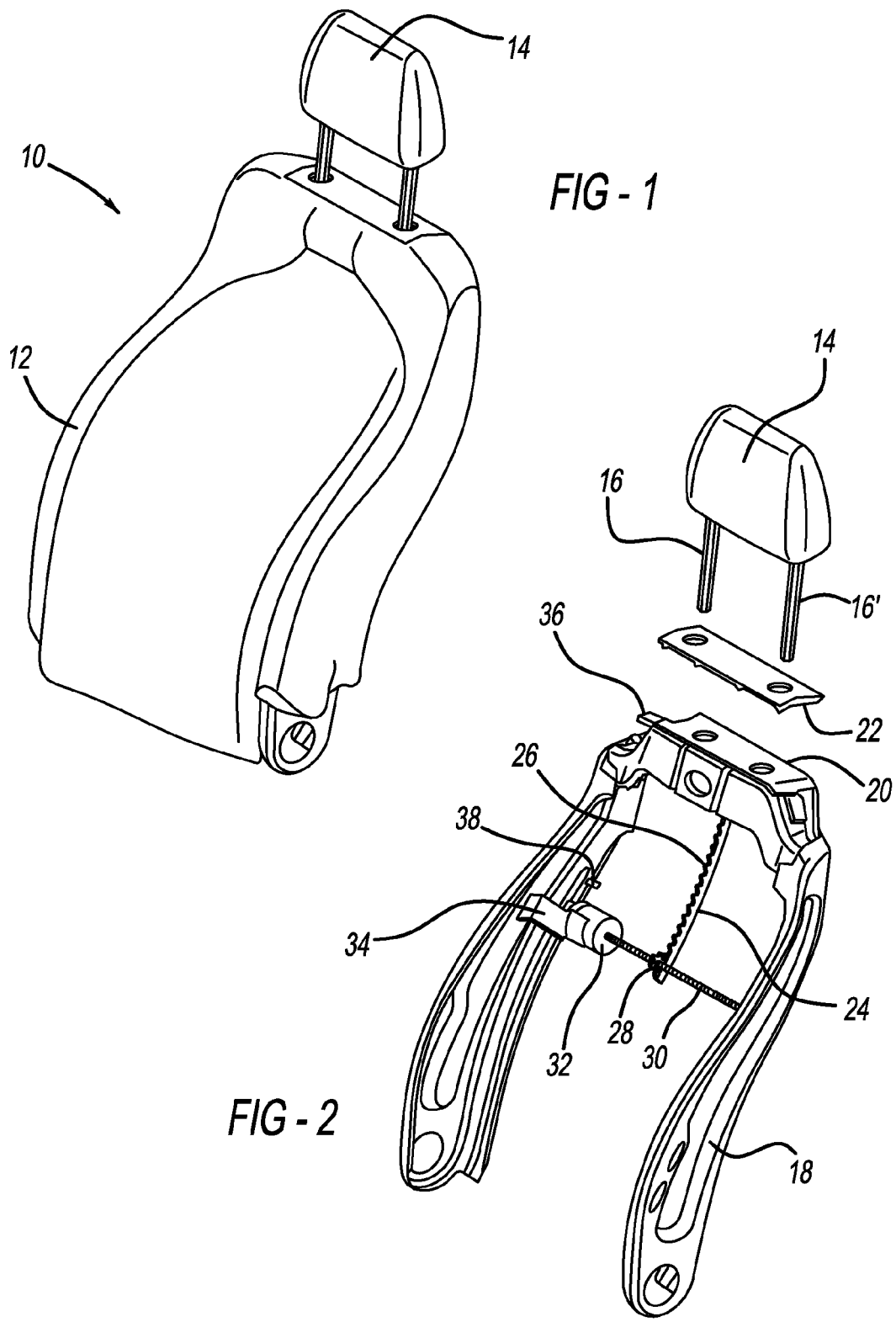

HIDDEN FRONT PASSENGER SEAT HEAD RESTRAINT FOR IMPROVED VISABILITY

TECHNICAL FIELD

The disclosed invention relates generally to automotive head restraints. More particularly, the disclosed invention relates to automotive head restraints, particularly front seat head restraints, that are movable between an upright position when the presence of front seat passenger is sensed and a lowered or hidden position when no front seat passenger presence and a rear seat passenger presence is sensed.

BACKGROUND OF THE INVENTION

Seat head restraints have been used for many years in automotive vehicles. These head restraints generally extend vertically from the seat back. They are provided for neck and head protection during rear impacts and thus may prevent neck injuries.

While providing valuable protection to the seat occupant should an impact event arise the front passenger seat head restraint may also obstruct side visibility to the driver of the vehicle and front visibility to a rear seat occupant. Ideally the front passenger would raise the head restraint before occupying the seat and would lower the head restraint when leaving the seat.

However, when the front passenger seat is actively used by a vehicle occupant, it is often impractical to put into place a disciplined regimen of raising and lowering the head restraint as required based on seat occupancy. The risk of the head restraint being left in its lowered position when the front passenger seat is occupied would likely result in the head restraint being left up at all times. The outcome of this approach is that the front passenger head restraint would more than likely cause an obstruction of side visibility to the driver of the vehicle and front visibility to a rear seat occupant at all times.

Accordingly, what is desired is a system that provides automatic movement of a front passenger head restraint between its upright position when a front seat passenger is present and its lowered position when no front seat passenger is present and when the rear seat is occupied.

SUMMARY OF THE INVENTION

The disclosed inventive concept overcomes several of the problems of the prior art by providing a head restraint for the front passenger seat in a vehicle that may be selectively raised or lowered depending on seat occupancy. Particularly, the front passenger head restraint is moved up from a stowed position each time a front seat passenger presence is detected according to one embodiment. According to another embodiment the front passenger head restraint is moved from a functional or upright position to a stowed or hidden position if the front seat is unoccupied and the rear seat is occupied.

The disclosed inventive concept is incorporated into an interior arrangement for a vehicle having a front passenger seat and a rear seat. Each of the front passenger seat and the rear seat is fitted with an occupant sensor. The front head restraint includes an associated position sensor and a head restraint actuator device such as a motor for moving the head restraint between its raised position and its lowered position.

Each of the occupant seat sensors, the head restraint position sensor and the head restraint actuator device such as a motor is operatively associated with a central controller. The controller is programmed to effect the raising or lowering of the restraint based on seat occupancy detected by one or more of the sensors.

According to one embodiment of the disclosed inventive concept if the occupant sensor of the front passenger seat detects no adult occupant then the head restraint is moved to its stowed position if not already in that position. On the other hand, if the occupant sensor of the front passenger seat detects an adult occupant in the front passenger seat then the head restraint is moved to its upright and functional position if not already in that position.

According to another embodiment of the disclosed inventive concept if the occupant sensor of the front passenger seat detects no adult occupant and an occupant sensor associated with the rear seat detects an occupant then the front passenger head restraint is moved to its stowed position if not already in that position. On the other hand, if the occupant seat sensor of the front passenger seat detects an adult occupant then the head restraint is moved to its upright and functional position regardless of the presence or absence of occupants in the rear seat.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein:

FIG. 1 illustrates a perspective view of a seat back illustrating the head rest in its raised or upright position according to the inventive concept disclosed herein;

FIG. 2 illustrates a perspective view of the seat back of FIG. 1 but shown without the cushion cover and shown in partially exploded view according to the inventive concept disclosed herein;

DETAILED DESCRIPTION OF THE PREFERRED EMBODIMENT

Figure 3:
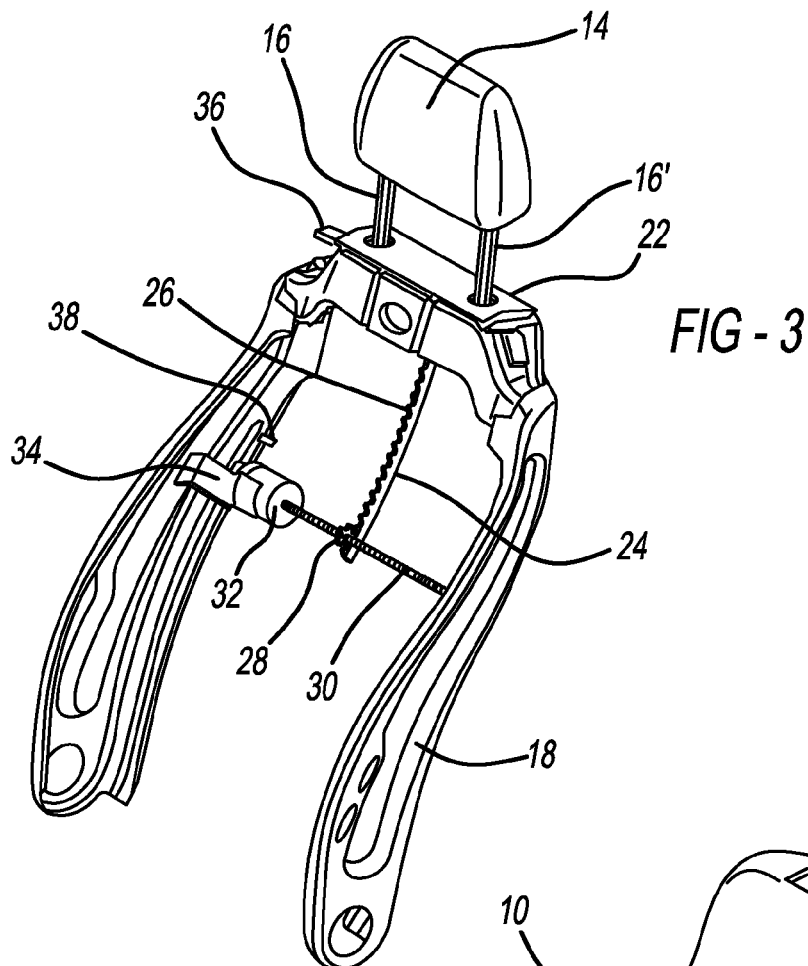
FIG. 3 illustrates a perspective view of FIG. 1 but shown without the cushion cover according to the inventive concept disclosed herein.

In the following figures, the same reference numerals will be used to refer to the same components. In the following description, various operating parameters and components are described for different constructed embodiments. These specific parameters and components are included as examples and are not meant to be limiting.

FIGS. 1 through 5 illustrate a seat back according to the disclosed inventive concept shown with the head restraint in its raised or upright position and in its lowered or hidden position. The configuration of the seat back illustrated in these figures is only suggestive and is not intended as being limiting.

Particularly, and with respect to FIG. 1, a perspective view of a seat portion for the front seat of a vehicle is shown. The seat portion, generally illustrated as 10, includes a seat back 12 and a head restraint 14. The head restraint 14 is illustrated in FIG. 1 as being in its raised or upright position.

FIGS. 2 and 3 are perspective views of the seat portion 10 also shown with the head restraint 14 in its raised or upright position relative to the seat back 12. This is the functional position that the head restraint 14 would have if the front passenger seat were occupied by an adult passenger. In this upright position the head restraint 14 would provide comfort and the necessary support for the occupant's head in an impact event.

However, unlike FIG. 1, the seat back 12 is illustrated in FIGS. 2 and 3 without the cushion cover to illustrate internal components. The view of FIG. 2 is partially exploded.

The head restraint 14 includes a support arrangement for attachment to the seat back 12. The support arrangement includes a pair of spaced apart posts 16 and 16' although other configurations, such as a single post (not shown) may be substituted for the posts 16 and 16' without deviating from the inventive concept as disclosed.

The head restraint support posts 16 and 16' are movably associated with a seat back frame 18 by fixed attachment to a movable support plate 20. A support plate cover 22 is fixed to the movable support plate 20. The head restraint support posts 16 and 16' movably pass through the support plate cover 22 upon movement of the head restraint 14 between its raised or upright position and in its lowered or hidden position.

A head restraint rack 24 is fixedly attached to the movable support plate 20. The head restraint rack 24 has a series of teeth 26 formed on one side. A rotatable head restraint pinion 28 operatively engages the teeth 26 of the head restraint rack 24. The rotatable head restraint pinion 28 is fixedly attached to a head restraint motor shaft 30.

The head restraint motor shaft 30 is driven by a head restraint motor 32 having an encoder. The head restraint motor 32 with encoder is attached to the seat back frame 18 by a head restraint motor mount bracket 34. While a single head restraint motor 32 is illustrated an alternative drive arrangement may include two or more motors. In addition, the position of the head restraint motor 32 with respect to the seat back frame 18 and the head restraint rack 24 may also be varied without deviating from the inventive concept disclosed herein.

Also fixed to the seat back frame 18 are an upper contact switch 36 and a lower contact switch 38. The upper contact switch 36 and the lower contact switch 38 are connected to the head restraint motor 32.

Figure 4:
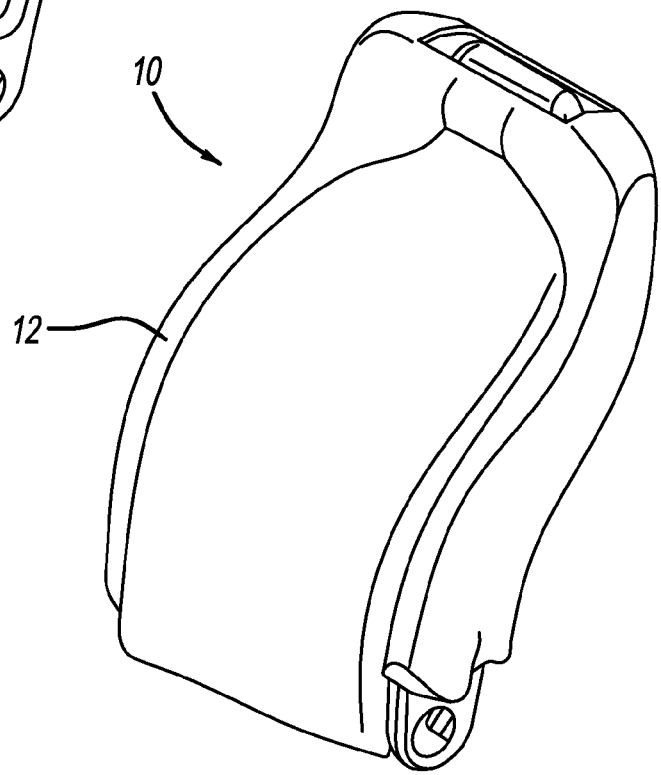
FIG. 4 illustrates a perspective view of a seat back illustrating the head rest in its lowered or hidden position according to the inventive concept disclosed herein.
Figure 5:
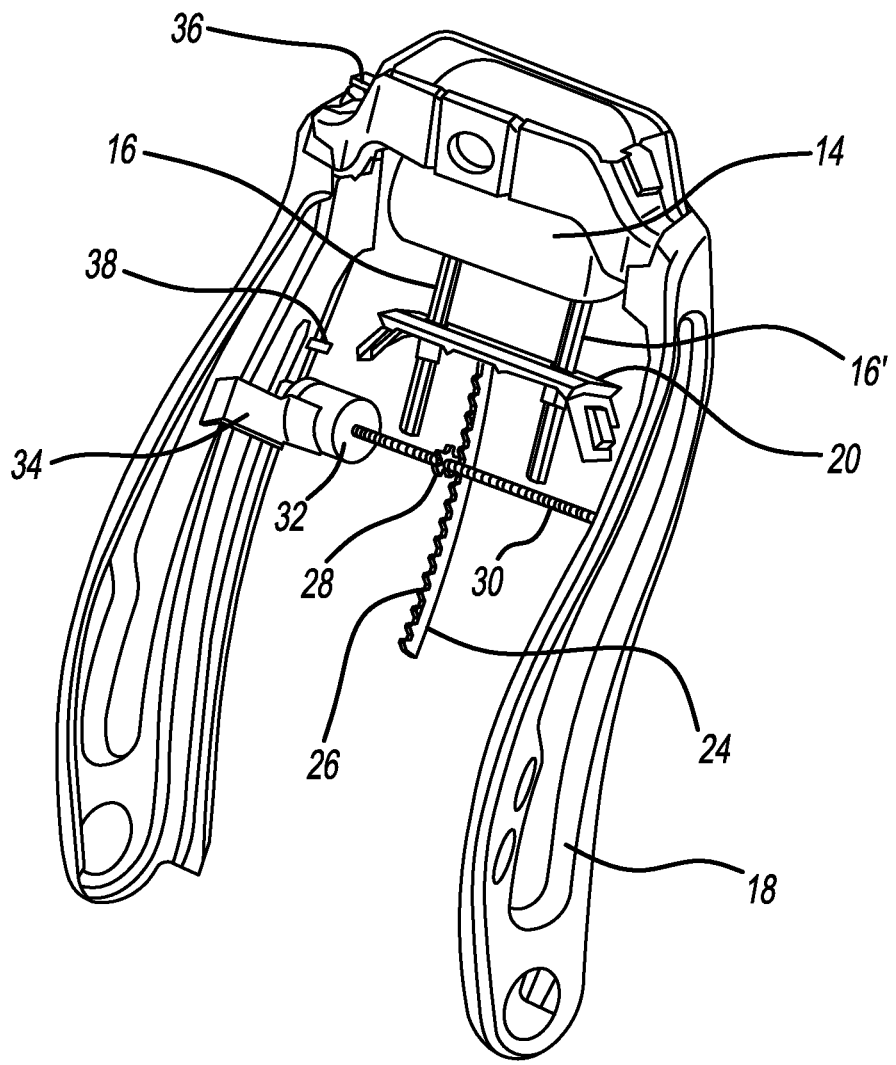
FIG. 5 illustrates a perspective view of the seat back of FIG. 4 but shown without the cushion cover according to the inventive concept disclosed herein.

While FIGS. 1, 2, and 3 illustrate the seat portion 10 in which the head restraint 14 is in its raised or upright position relative to the seat back 12 in FIGS. 4 and 5 the head restraint 14 is illustrated as being in its lowered or hidden position. As shown in FIGS. 4 and 5, the head restraint 14 is shown recessed completely into the upper portion of the seat back 12. However, it is to be understood that as an alternative to the head restraint 14 lowering into the upper portion of the seat back 12 the head restraint 14 may instead fold into a pocket formed in the upper portion of the seat back 12 (not shown). Either way the objective of the disclosed invention is to eliminate the head restraint 14 from the driver's line-of-sight when no occupant is present in the front passenger seat or from the rear seat passenger's line-of-sight again when no occupant is present in the front passenger seat.

In operation, when the head restraint 14 is in its raised or upright position for use when an occupant is in the seat, the movable support plate 20 and its associated head restraint support posts 16 and 16' have been driven to their uppermost position. This movement is caused by the operation of the head restraint motor 32 rotating the head restraint motor shaft 30 and its associated head restraint pinion 28 which movably engages the head restraint rack 24.

Upward movement of the head restraint 14 is halted when the movable support plate 20 comes into contact with the upper contact switch 36. Once contact is made between the movable support plate 20 and the upper contact switch 36 a signal is sent to the head restraint motor 32 to stop rotation.

When the passenger seat occupant is no longer present the hear restraint 14 may be moved to the lowered or hidden position as shown in FIGS. 4 and 5. Movement to this position is effected by operation of the head restraint motor 32 in a direction that is reversed from the direction used to raise the head restraint 14. Rotation of the head restraint motor 32 in the opposite direction drives the head restraint motor shaft 30 and its associated head restraint pinion 28 so that the head restraint rack 24 is moved downward, bringing with it the attached movable support plate 20, the attached head restraint posts 16 and 16' attached to the head restraint 14.

Downward movement of the movable support plate 20 and its associated elements is halted when the movable support plate 20 comes into contact with the lower contact switch 38. Once contact is made a signal is sent to the head restraint motor 32 to halt rotation and the step of lowering the head restraint 14 relative to the seat back 12 is completed.

Figure 6:
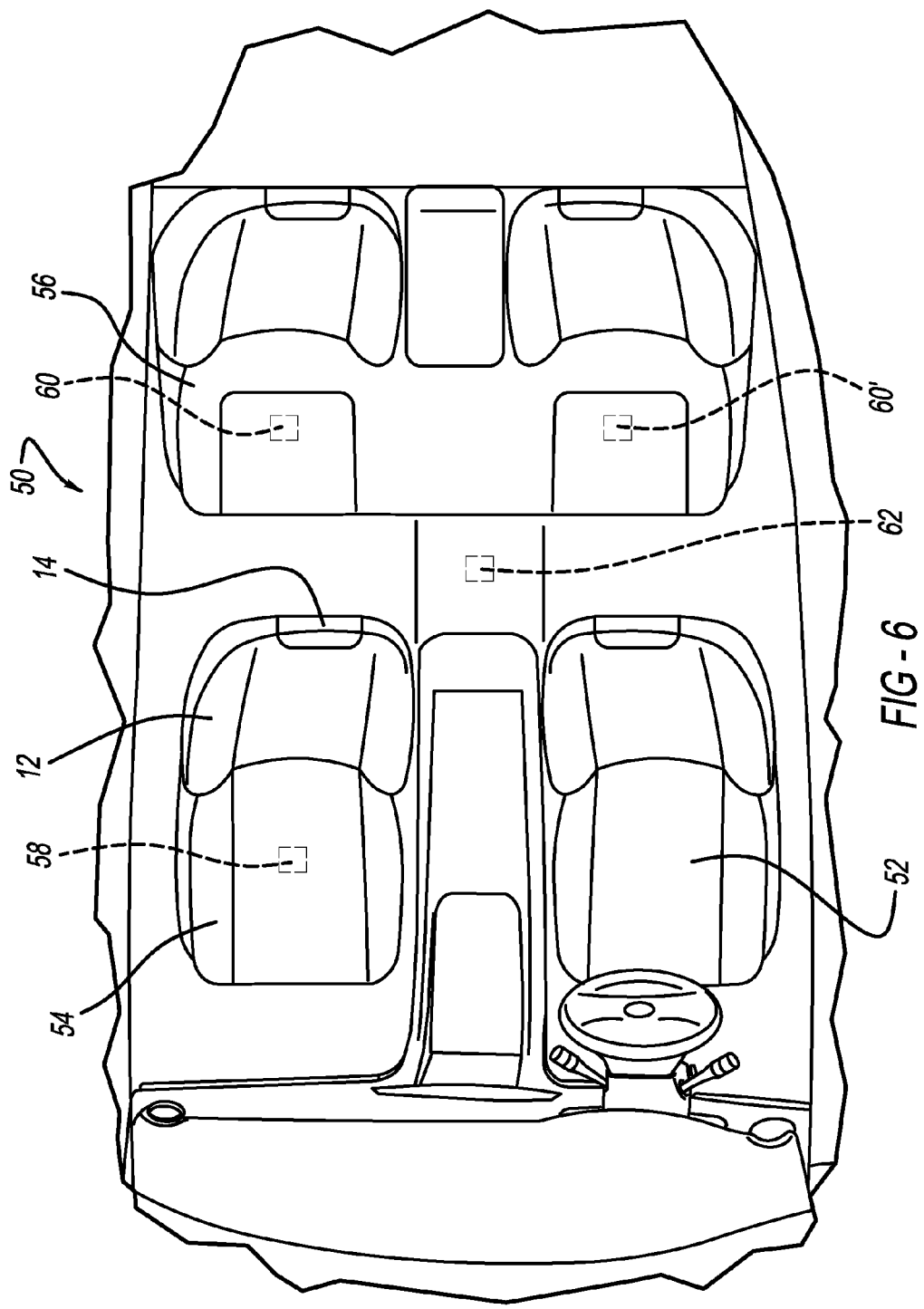
FIG. 6 illustrates a top view of a vehicle interior fitted with seats having sensors according to the inventive concept disclosed herein.

Referring to FIG. 6, a top view of a vehicle interior, generally illustrated as 50, is shown. The interior 50 includes a driver seat 52, a front or forward passenger seat 54 to which the seat back 12 is attached, and a rear or rearward seat 56. The front passenger seat 54 includes an occupant sensor 58. The rear seat 56 includes occupant sensors 60 and 60' although additional occupant sensors (not shown) may be incorporated. It is to be understood that while the view of the vehicle interior shown in FIG. 6 illustrates only forward and rearward sets of seats other vehicle interior configurations may benefit from the inventive concept disclosed herein. For example, in a vehicle such as a van or an SUV having third row seating, the head restraint 14 referenced herein may in fact be fitted to a second row seat.

The sensors 58, 60 and 60' may be of any type of sensor designed for the purpose of seat occupant presence detection. Particularly, the sensors may be selected from the group consisting of switch sensors, capacitive sensors, vision sensors, ultrasound sensors, electric field sensors, electro-resistive sensors, and optical sensors. The occupant presence detection sensors may be located in the seat or at any other suitable location in the vehicle interior for the detection of seated occupants. Additional sensors may be employed for this purpose.

The head restraint motor 30 and the seat sensors 58, 60 and 60' are operatively associated with a central controller 62. The central controller 62 is programmed to follow one of two routines set forth in FIGS. 7 and 8.

Figure 7:
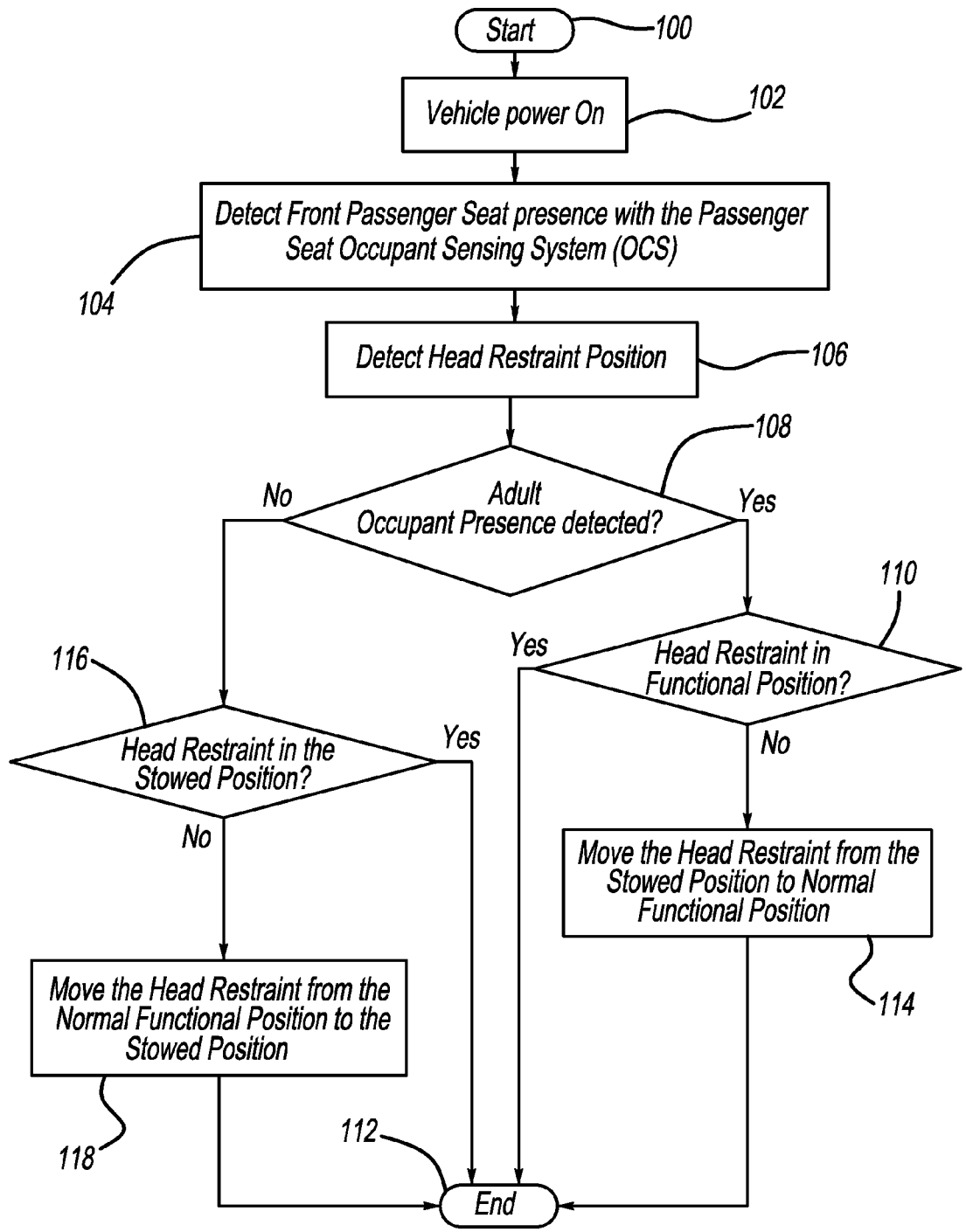
FIG. 7 is a flow chart depicting functionality according to a first embodiment of the inventive concept disclosed herein.

With respect to FIG. 7, a flow chart depicting functionality according to a first embodiment of the inventive concept is illustrated. With respect to FIG. 8, a flow chart depicting functionality according to a second embodiment of the inventive concept is illustrated. The disclosed functionalities are suggested and are not intended as being limiting as would be understood by one skilled in the art.

Figure 8:
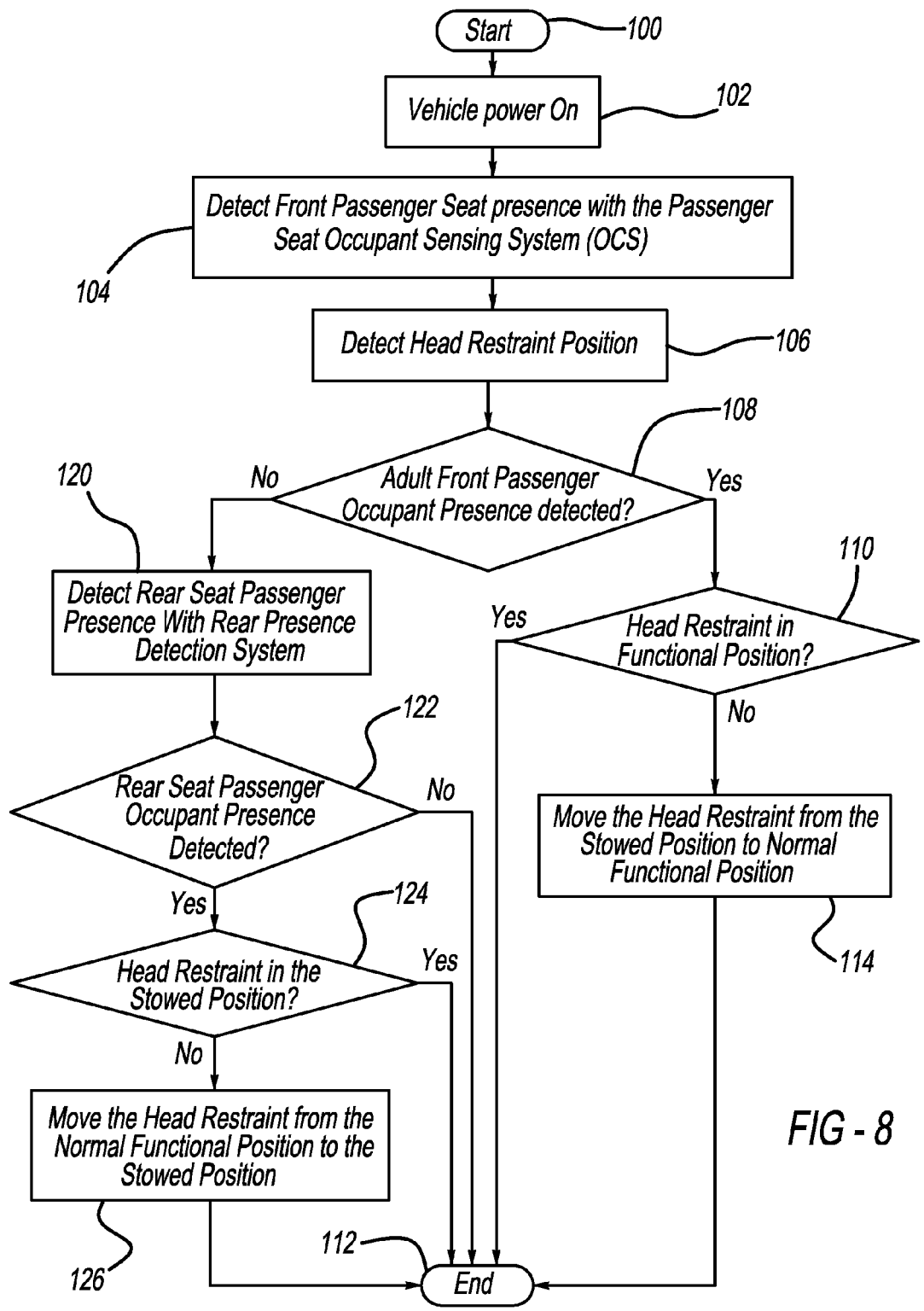
FIG. 8 is a flow chart depicting functionality according to a second embodiment of the inventive concept disclosed herein.

Both embodiments of the inventive concepts disclosed in FIGS. 7 and 8 share in common steps 100 through step 114. These steps are described as follows.

Initially, and at the start 100, the vehicle power is turned on at 102. Subsequently, at step 104, the presence detection of a front seat passenger in the front passenger seat 54 is made by the seat Occupant Classification System (OCS). Some occupant detection and classification systems may also perform additional tasks such as classification of adult occupants in 5, 50 and 95 percentile categories.

The position of the head restraint 14 is then determined at 106. Specifically, a determination is made as to whether the head restraint 14 is in its functional and raised position (shown in FIGS. 1, 2 and 3) or if it is in its stowed and lowered position (shown in FIGS. 4 and 5).

A determination is made at step 108 as to whether or not the occupant whose presence was detected at step 104 is an adult occupant or not according to the OCS. If the determination at step 108 results in a finding that the occupant is an adult, then an inquiry is made at step 110 if the head restraint 14 is in its functional or raised position.

If it is determined at step 110 that the head restraint 14 is in its functional and upright position then the inquiry of the program is at an end at step 112.

On the other hand, if it is determined at step 110 that the head restraint 14 is not in its functional and upright position then the head restraint 14 is moved from its stowed position to its normal functional or raised position. Once the head restraint 14 is moved to this position then the inquiry of the program is at an end at step 112.

Referring to FIG. 7 which represents the first embodiment of the inventive concept disclosed herein, if at step 108 it is determined that no adult occupant is detected present in the front passenger seat 54 of the vehicle, then an inquiry is made at step 116 if the passenger head restraint 14 is in its stowed position. If the response to the inquiry made at step 116 is affirmative, then the inquiry of the program is at the end at step 112.

On the other hand, if the response to the inquiry made at step 116 is negative, then the head restraint 14 is moved from its functional position to the stowed position at step 118. Thereafter the inquiry of the program is at the end at step 112.

Referring to FIG. 8 which represents the second embodiment of the inventive concept disclosed herein, if at step 108 it is determined that no adult occupant is detected present in the front passenger seat 54 of the vehicle, then the presence of a passenger in the rear seat 56 is made at step 120. Thereafter, at step 122, if it is determined that there is no occupant in the rear seat 56 then the inquiry of the program is at the end at step 112.

If it is determined at step 122 that a passenger does in fact occupy the rear seat 56 then an inquiry is made at step 124 if the head restraint 14 is in the stowed position. If the determination at step 124 is affirmative, then the inquiry of the program is at the end at step 112.

However, if it is determined at step 124 that the head restraint 14 is in its functional and upright position then the head restraint 14 is moved to its stowed and lowered position at step 126. Thereafter the inquiry of the program is at the end at step 112.

The foregoing discussion discloses and describes exemplary embodiments of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A method of moving a front passenger seat head restraint between functional and stowed positions in a vehicle having a front passenger seat for a front passenger seat occupant and a rear seat for a rear seat occupant comprising the steps of:
    forming a system having detectors for detecting the rear seat occupant and the front passenger seat occupant and for moving the front passenger seat head restraint, said system including a programmed controller;
    starting the vehicle;
    detecting a presence of an occupant in the front passenger seat and a presence of an occupant in the rear seat;
    determining if the front passenger seat head restraint is in the functional position or in the stowed position; and
    moving the head restraint of the front passenger seat to the functional position if the front passenger seat occupant is detected or to the stowed position if no front passenger seat occupant is detected and the rear seat occupant is detected.

2. The method of moving the head restraint of claim 1 wherein said step of detecting the presence of the front passenger seat occupant includes the step of detecting if the passenger is an adult occupant.

3. The method of moving the head restraint of claim 2 including the step of determining if the head restraint is in the stowed position if it is determined that no adult passenger is present in the passenger seat.

4. The method of moving the head restraint of claim 3 including the step of determining if the head restraint is in not in the stowed position then moving the passenger head restraint from the functional position to the stowed position.

5. The method of moving the head restraint of claim 4 including the step of moving the head restraint from the functional position to the stowed position if it is determined that the head restraint is not already in the stowed position.

6. A method of moving a front passenger seat head restraint between functional and stowed positions in a vehicle having a front passenger seat for an adult front passenger seat occupant and a rear seat for a rear seat occupant comprising the steps of:
    forming a system having a detector for detecting the adult front passenger seat occupant and rear seat occupants and for moving the front head restraint, said system including a programmed controller;
    detecting an adult passenger;
    detecting if the front head restraint is in the functional position or in the stowed position; and
    moving the front head restraint to the functional position if the adult front passenger seat occupant is detected or moving the front head restraint to the stowed position if no adult front passenger seat occupant is detected and if the rear seat occupant is detected.

7. The method of moving the head restraint of claim 6 including the step of determining if the head restraint is in not in the stowed position then moving the head restraint from the functional position to the stowed position if no passenger is detected.

8. The method of moving the head restraint of claim 7 including the step of moving the head restraint from the functional position to the stowed position if it is determined that the head restraint is not already in the stowed position.

* * * * *